(12) United States Patent
Wang et al.

(10) Patent No.: US 11,304,090 B2
(45) Date of Patent: Apr. 12, 2022

(54) METHOD FOR CORRECTING AUDIO DATA DURING DUAL WIRELESS COMMUNICATION AND WIRELESS PLAYBACK SYSTEM

(71) Applicant: ZHUHAI JIELI TECHNOLOGY CO., LTD, Guangdong (CN)

(72) Inventors: Youpan Wang, Guangdong (CN); Xiangjun Hu, Guangdong (CN); Yulin Deng, Guangdong (CN); Lihui Huang, Guangdong (CN)

(73) Assignee: ZHUHAI JIELI TECHNOLOGY CO., LTD, Zhuhai (CN)

( * ) Notice: Subject to any disclaimer, the term of this patent is extended or adjusted under 35 U.S.C. 154(b) by 78 days.

(21) Appl. No.: 16/903,375

(22) Filed: Jun. 16, 2020

(65) Prior Publication Data

US 2021/0136623 A1 May 6, 2021

(30) Foreign Application Priority Data

Nov. 6, 2019 (CN) .......................... 201911076317.2

(51) Int. Cl.
*H04W 28/04* (2009.01)
*H04W 76/15* (2018.01)
*H04W 4/80* (2018.01)
*H04B 5/00* (2006.01)
*H04R 5/033* (2006.01)
*H04W 24/08* (2009.01)

(52) U.S. Cl.
CPC .......... *H04W 28/04* (2013.01); *H04B 5/0006* (2013.01); *H04R 5/033* (2013.01); *H04W 4/80* (2018.02); *H04W 24/08* (2013.01); *H04W 76/15* (2018.02); *H04R 2420/07* (2013.01)

(58) Field of Classification Search
CPC ....... H04W 28/04; H04W 4/80; H04W 24/08; H04W 76/15; H04W 84/18; H04B 5/0006; H04B 5/0031; H04R 5/033; H04R 2420/07; H04L 1/0041; H04L 1/0009; H04L 1/1829; H04L 2001/0097; H04L 43/0829; H04L 43/0847
See application file for complete search history.

(56) References Cited

U.S. PATENT DOCUMENTS

2020/0329400 A1* 10/2020 Goyal ..................... H04W 4/80

FOREIGN PATENT DOCUMENTS

CN  107135256 A  9/2017

\* cited by examiner

*Primary Examiner* — Eugene Yun

(57) ABSTRACT

A method for correcting audio data during dual wireless communication, includes: a first wireless device (102) sequentially receiving a plurality of audio data packets sent by a wireless audio source device (101); a second wireless device (103) sequentially monitoring the plurality of audio data packets sent by the wireless audio source device (101); the second wireless device (103) feeding back information about the audio data packets not been properly monitored by the second wireless device (103) to the first wireless device (102); the first wireless device (102) identifying the audio data packets not been properly monitored by the second wireless device (103) among the plurality of audio data packets; and after receiving the plurality of audio data packets, the first wireless device (102) forwarding the audio data packets not been properly monitored by the second wireless device (103) to the second wireless device (103).

10 Claims, 11 Drawing Sheets

МЕТHOD FOR CORRECTING AUDIO DATA DURING DUAL WIRELESS COMMUNICATION AND WIRELESS PLAYBACK SYSTEM

CROSS REFERENCE TO RELATED APPLICATIONS

The present application claims the benefit of Chinese Patent Application No. 201911076317.2 filed on Nov. 6, 2019, the contents of which are incorporated herein by reference in their entirety.

FIELD OF THE INVENTION

The present invention relates to the field of wireless communication, and in particular, to a method for correcting audio data of dual wireless communication and a wireless playback system.

BACKGROUND OF THE INVENTION

With the progress of society and the improvement of people's living standards, wireless devices, including Bluetooth headphones, Bluetooth speakers, various smart wearable devices, etc., have become essential items for people's lives. These smart wearable devices are also inclined to the development trend of wireless data interaction. Taking Bluetooth headsets as an example, both the left and right headsets use Bluetooth communication for data interaction with audio source device, which is called a dual wireless Bluetooth communication system.

In an application of dual wireless Bluetooth communication, such as dual wireless Bluetooth headsets and dual wireless Bluetooth speakers, three Bluetooth devices are required to communicate through at least two Bluetooth links, thereby forming a dual wireless Bluetooth communication system. That is, the dual wireless Bluetooth communication system includes three Bluetooth devices, one of which is a Bluetooth audio source device (e.g. a mobile phone, a laptop, etc.), and the other two are wireless Bluetooth devices that play simultaneously (e.g. dual wireless Bluetooth headsets, dual wireless Bluetooth speakers etc.). Referring to FIG. 1a, which is a schematic structural diagram of a dual wireless Bluetooth communication system in the prior art, the dual wireless Bluetooth communication system includes a Bluetooth audio source device 101', a first Bluetooth device 102', and a second Bluetooth device 103'. The Bluetooth audio source device 101' provides audio data; the first Bluetooth device 102' acts as a Bluetooth playback master device, and establishes a connection with the Bluetooth audio source device 101' through a first Bluetooth link, and receives audio data provided by the Bluetooth audio source device 101' via the first Bluetooth link; the second Bluetooth device 103' acts as a Bluetooth playback slave device, and monitors the audio data provided by the Bluetooth audio source device 101' via a Bluetooth monitoring link; the first Bluetooth device 102' and the second Bluetooth device 103' are connected via a second Bluetooth link and can perform operations such as data forwarding.

When the first Bluetooth device 102' and the second Bluetooth device 103' receives and monitors the audio data provided by the Bluetooth audio source device 101', due to the influence of the environment or signal interference etc., data reception error or packet loss often occurs. At this time, data forwarding and/or error correction is performed between the first Bluetooth device 102' and the second Bluetooth device 103', or data retransmission is performed by monitoring the Bluetooth audio source device 101' to resolve data reception error or packet loss.

In the prior art, error correction is used to correct unsuccessfully listened audio packets in order to reduce the amount of data transmission. Referring to FIG. 1b, which is a working sequence diagram of a dual wireless Bluetooth communication system in the prior art:

The Bluetooth audio source device 101' provides audio data packets to the first Bluetooth device 102' and the second Bluetooth device 103' (step S1);

The first Bluetooth device 102' receives the audio data packets and the second Bluetooth device 103' monitors audio data packets, respectively, and the first Bluetooth device 102' sends an ACK signal to the Bluetooth audio source device 101' after receiving the audio data packets, indicating that the audio data packets has been received (step S11), at which point the first Bluetooth device 102' switches from a receiving state to a sending state;

The first Bluetooth device 102' sends an error correction packet (ECC packet) to the second Bluetooth device 103', and receives an ACK response from the second Bluetooth device 103' in response to the error correction packet (step S12), at which point the first Bluetooth device 102' switches from the sending state to the receiving state;

If the second Bluetooth device 103' fails to correct the error, the first Bluetooth device 102' shall forward the audio data packets to the second Bluetooth device 103' (step S13), at which point the first Bluetooth device 102' switches from the receiving state to the sending state;

The first Bluetooth device 102' receives an ACK response from the second Bluetooth device 103' in response to the forwarded audio data packet (step S14), at which point the first Bluetooth device 102' switches from the sending state to the receiving state;

The first Bluetooth device 102' and the second Bluetooth device 103' receive new audio data packets sent by the Bluetooth audio source device 101' (step S2).

The solution of the prior art can indeed reduce the amount of data transmission, but its error correction and forwarding operation for each data packet will bring the first Bluetooth device 102' to switch states of receiving and sending multiple times, that is, the antenna of the first Bluetooth device 102' and its matching hardware circuit need to be configured with different states of parameters multiple times. Referring to FIG. 1b, in a data transceiving cycle of the Bluetooth audio source device 101', that is, between step S1 and step S2, in order to achieve error correction and forwarding between the first Bluetooth device 102' and the second Bluetooth device 103', the first Bluetooth device 102' needs to switch states of receiving and sending multiple times during the transceiving cycle, as shown in steps S11-14 above, at least four transceiving state switching are performed; at the same time, the second Bluetooth device 103' also performs multiple transceiving state switching. The switching of the sending and receiving states will cause time loss and bandwidth loss. Therefore, in the prior art, in order to implement error correction, more time and bandwidth are wasted in one data transceiving cycle.

SUMMARY OF THE INVENTION

Based on the above situation, the main purpose of the present invention is to provide a method for correcting audio data during dual wireless communication, device, equipment and system, so as to reduce time waste or bandwidth loss in the process of data sending and receiving.

To achieve the above purpose, the present invention provides a method for correcting audio data during dual wireless communication, applied in a first wireless device and a second wireless device, wherein the first wireless device and the second wireless device forming a wireless playback device pair, the first wireless device receiving audio data packets from a wireless audio source device, and the second wireless device monitoring the audio data packets from the wireless audio source device. The method comprises the following steps.

Step S501: the first wireless device sequentially receives a plurality of audio data packets sent by the wireless audio source device.

Step S502: the second wireless device sequentially monitors the plurality of audio data packets sent by the wireless audio source device.

Step S503: the second wireless device feeds back information about the audio data packets not been properly monitored by the second wireless device to the first wireless device.

Step S504: the first wireless device identifies the audio data packets not been properly monitored by the second wireless device among the plurality of audio data packets.

Step S505: after receiving the plurality of audio data packets, the first wireless device forwards the audio data packets not been properly monitored by the second wireless device to the second wireless device.

According to the method for correcting audio data during dual wireless communication disclosed in an embodiment of the present invention, in the process of receiving the plurality of audio data packets in sequence, the hardware circuit of the first wireless device may be maintained under the receiving state. After receiving the plurality of audio data packets from the wireless audio source device, the first wireless device switches to the sending state, and forwards the audio data packets not been properly monitored by the second wireless device to the second wireless device, and corrects the audio data packets monitored by the second wireless device. Compared with the prior art, in which the first wireless device needs to perform multiple state switching in one data transceiving cycle, in the embodiment of the present invention, the first wireless device only needs to switch its state once for the plurality of audio data packets, which can effectively reduce the number of state switching of the first wireless device in the process of data sending and receiving, thereby reduce the time waste and bandwidth loss caused by the state switching of the first wireless device in the process of data sending and receiving, improve the efficiency of data sending and receiving, and reduce the waste of communication bandwidth resources.

The present invention further provides a method for correcting audio data during dual wireless communication, applied in a first wireless device, wherein the first wireless device and a second wireless device forming a wireless playback device pair, the first wireless device receiving audio data packets from a wireless audio source device, and the second wireless device monitoring the audio data packets from the wireless audio source device. The method comprises the following steps.

Step S201: sequentially receives a plurality of audio data packets sent by the wireless audio source device; at the same time the second wireless device sequentially monitors the plurality of audio data packets sent by the wireless audio source device;

Step S202: identifies the audio data packets not been properly monitored by the second wireless device among the plurality of audio data packets; and Step S203: after receiving the plurality of audio data packets, forwards the audio data packets not been properly monitored by the second wireless device to the second wireless device.

According to the method for correcting audio data during dual wireless communication disclosed in an embodiment of the present invention, in the process of receiving the plurality of audio data packets in sequence, the hardware circuit of the first wireless device may be maintained under the receiving state. After receiving the plurality of audio data packets from the wireless audio source device, the first wireless device switches to the sending state, and forwards the audio data packets not been properly monitored by the second wireless device to the second wireless device, and corrects the audio data packets monitored by the second wireless device. Compared with the prior art, in which the first wireless device needs to perform multiple state switching in one data transceiving cycle, in the embodiment of the present invention, the first wireless device only needs to switch its state once for the plurality of audio data packets, which can effectively reduce the number of state switching of the first wireless device in the process of data sending and receiving, thereby reduce the time waste and bandwidth loss caused by the state switching of the first wireless device in the process of data sending and receiving, improve the efficiency of data sending and receiving, and reduce the waste of communication bandwidth resources.

Optionally, step S202 comprises: receiving an additional packet sent by the second wireless device at an idle time between intervals of receiving each audio data packet, wherein the additional packet is used to indicate a monitoring status of the second wireless device for a current audio data packet; determining whether the second wireless device has successfully monitored the current audio data packet based on the additional packet; identifying the current audio data packet as the audio data packets not been properly monitored by the second wireless device if the second wireless device fails to monitor the current audio data packet.

In this embodiment, since the additional packet sent by the second wireless device is received at an idle time between the intervals of receiving each audio data packet, and the additional packet indicates a monitoring status of the second wireless device for the current audio data packet, the additional packet can be used to determine whether the second wireless device has successfully monitored the current audio data packet. In this embodiment, transmitting the monitoring status through the additional packet, does not occupy bandwidth resources and reduces bandwidth loss.

Optionally, step S202 comprises: after completing operation of receiving the plurality of audio data packets from the wireless audio source device, receiving monitoring information sent by the second wireless device, wherein the monitoring information indicates the monitoring status of the second wireless device for the plurality of audio data packets; identifying the audio data packets not been properly monitored by the second wireless device based on the monitoring information.

In this embodiment, after receiving the plurality of audio data packets from the wireless audio source device, the monitoring information sent by the second wireless device is collectively received to identify the audio data packets not been properly monitored by the second wireless device. Therefore, in this process, the first wireless device is under the receiving state during the process of receiving the plurality of audio data packets and receiving the monitoring information, that is, the first wireless device does not produce the time waste and bandwidth loss caused by state switch, improving the efficiency of sending and receiving data and reducing the waste of communication bandwidth resources.

The present invention further provides a wireless playback system, comprising: a first wireless device, configured to receive and play audio data packets sent by a wireless audio source device; a second wireless device, configured to monitor and play the audio data packets sent by the wireless audio source device; wherein: the first wireless device and the second wireless device forms a wireless playback device pair; the first wireless device sequentially receives a plurality of audio data packets sent by the wireless audio source device; the second wireless device sequentially monitors the plurality of audio data packets sent by the wireless audio source device; the second wireless device feeds back information about the audio data packets not been properly monitored by the second wireless device to the first wireless device; the first wireless device identifies the audio data packets not been properly monitored by the second wireless device among the plurality of audio data packets; after receiving the plurality of audio data packets, the first wireless device forwards the audio data packets not been properly monitored by the second wireless device to the second wireless device; and the second wireless device receives the forwarded audio data packets from the first wireless device to correct the audio data packets not been properly monitored by the second wireless device.

BRIEF DESCRIPTION OF THE DRAWINGS

The following further describes the present invention with reference to the accompanying drawings and embodiments. In the accompanying drawings.

DETAILED DESCRIPTION

With reference to accompanying drawing, exemplary embodiments of the present invention are described in detail.

The inventors of the present application found that in the future, with the improvement of hardware capabilities and processor capabilities, large-capacity communication data can be processed in time and effectively, and in order to process communication data in a more timely and effective manner, the utilization rate of baseband is particularly important. Therefore, the overall concept of the present invention, compared with the technical route of reducing the data transmission amount in the prior art, is to reduce the frequency of the sending and receiving state switching of the Bluetooth device as much as possible, and thus reduce the bandwidth loss due to the sending and receiving state switching.

Figure 1A:
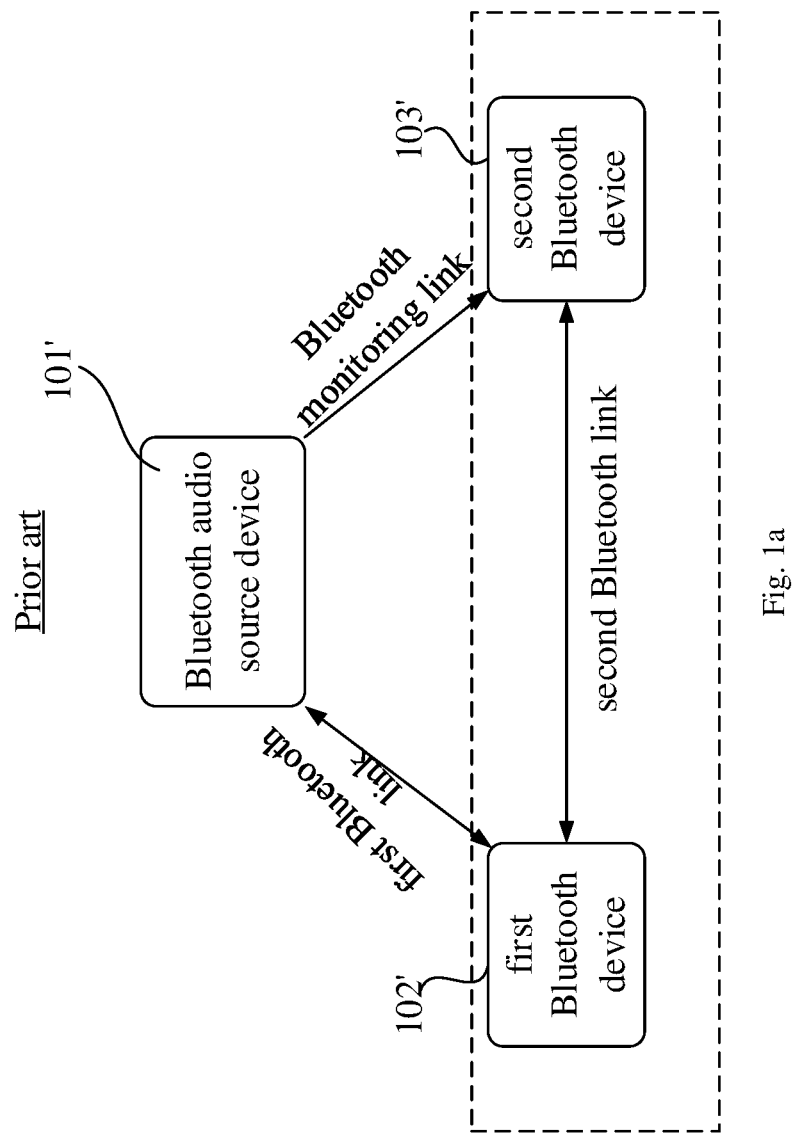
FIG. 1a is a schematic diagram of the structure of a dual wireless communication system according to the prior art.
Figure 1B:
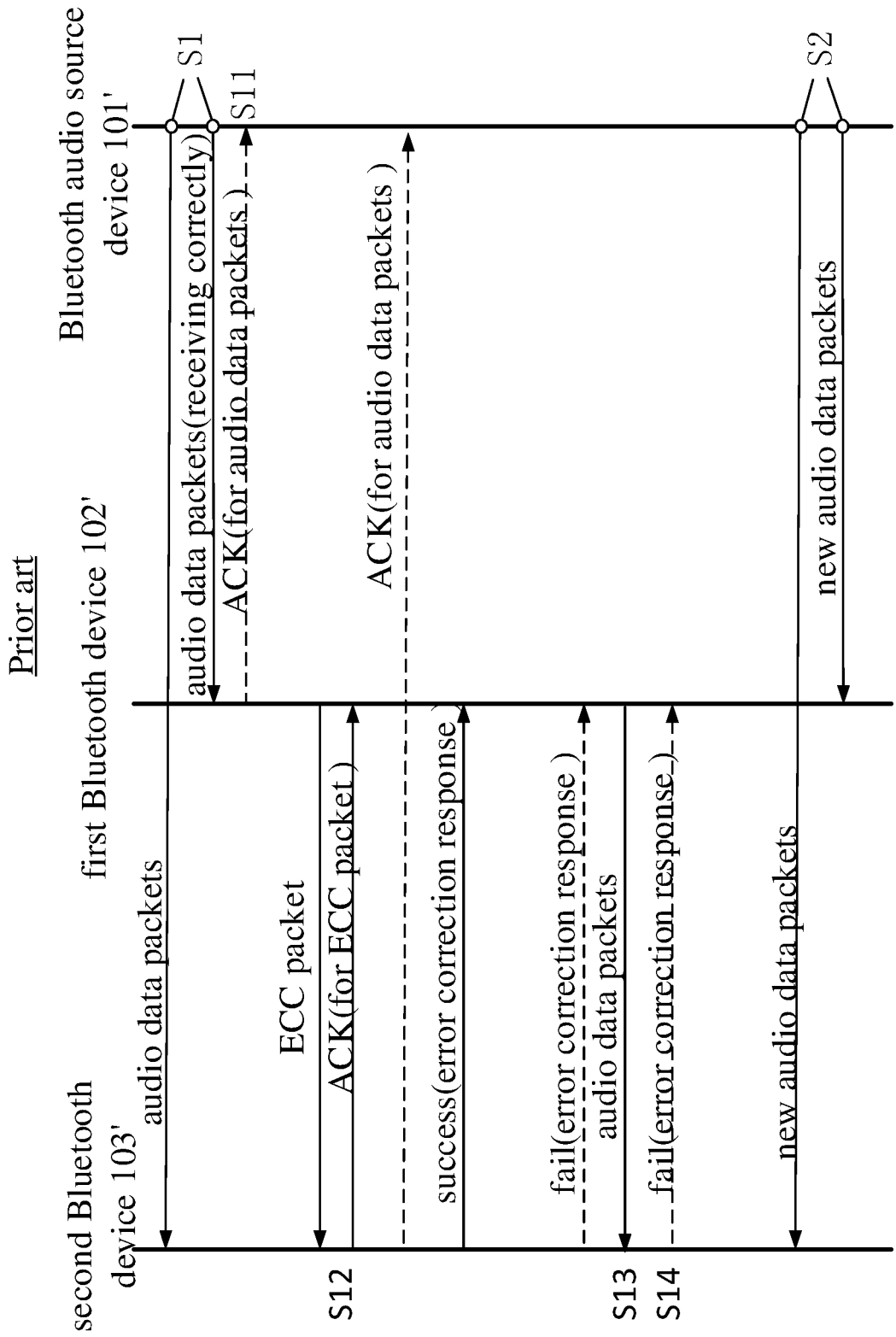
FIG. 1b shows a working sequence diagram of a dual wireless communication network according to the prior art.
Figure 1C:
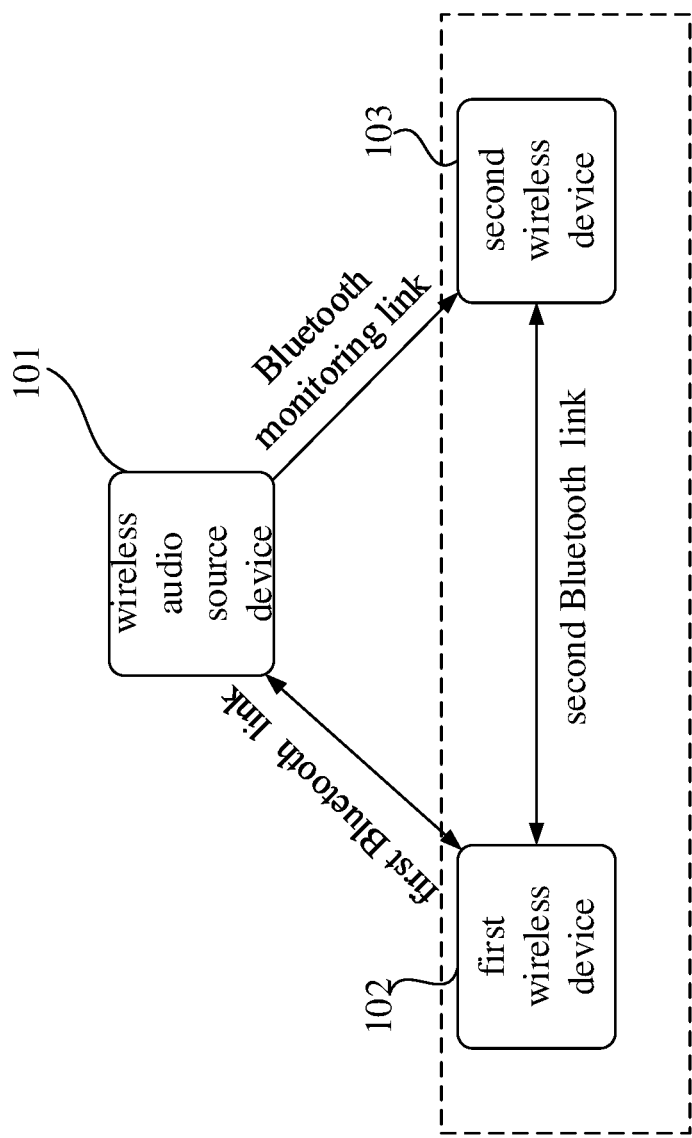
FIG. 1c is a schematic diagram of the structure of a dual wireless communication system according to an embodiment of the present invention.

In a dual wireless communication network, in order to reduce problems such as time waste or bandwidth loss when data correction and forwarding between a first wireless device 102 and a second wireless device 103, this embodiment discloses a method for correcting audio data during dual wireless communication. Referring to FIG. 1c, the dual wireless communication network includes a wireless audio source device 101, the first wireless device 102 and the second wireless device 103. The wireless audio source device 101 may be a mobile phone, tablet computer, notebook, audio-video player, etc. that has Bluetooth communication function and audio data providing function. The first Bluetooth device 102 and the second wireless device 103 are used to play the audio data provided by the Bluetooth audio source device 101, and the first wireless device 102 and the second wireless device 103 may be paired Bluetooth headphones or paired Bluetooth speakers, and other playback devices with Bluetooth communication functions. In a specific implementation, the first wireless device 102 is a Bluetooth playback master device, the second wireless device 103 is a Bluetooth playback slave device, that is, the first wireless device 102 interacts with the wireless audio source device 101 through a first Bluetooth link, and the second wireless device 103 monitors the audio data sent by the wireless audio source device 101 through a Bluetooth listening link.

In particularly, the wireless audio source device 101, the first wireless device 102 and the second wireless device 103 are all Bluetooth devices in the following embodiment the present invention, the dual wireless communication network is a dual wireless Bluetooth communication network, the Bluetooth playback system is a wireless playback system.

Figure 2:
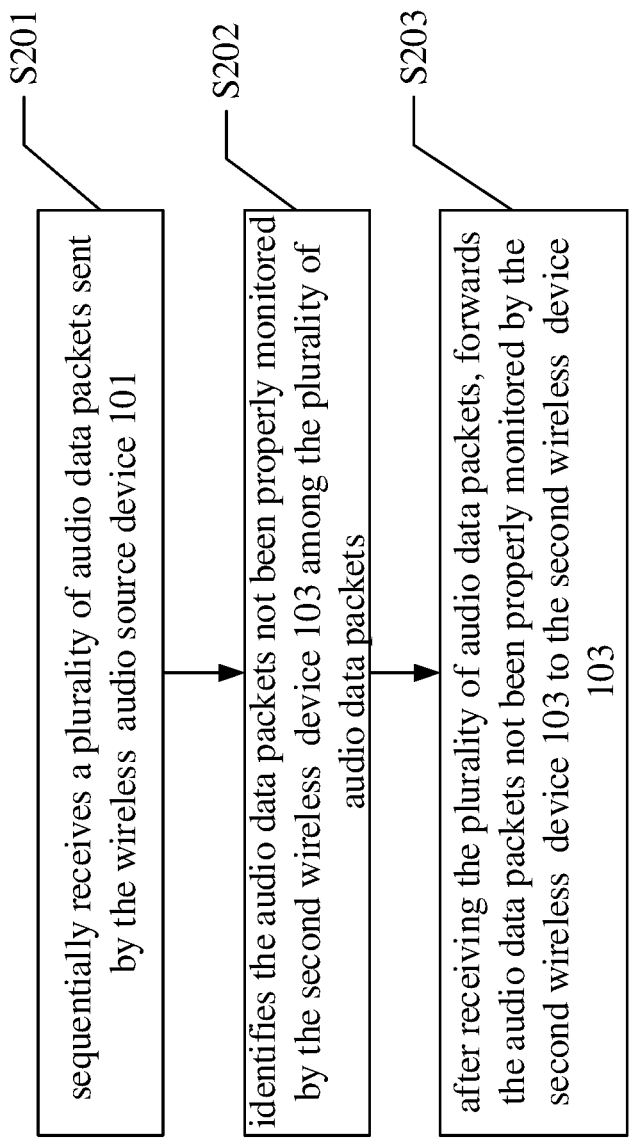
FIG. 2 is a flowchart of a method for correcting audio data during dual wireless communication at the end of a first wireless device in accordance with an embodiment of the present invention.

Referring to FIG. 2, it is a flowchart of a method for correcting audio data during dual wireless communication in one embodiment of the present invention. The method is applied in the first wireless device 102 of the dual wireless communication network. The method for correcting audio data includes steps S201 to S203.

Figure 3A:
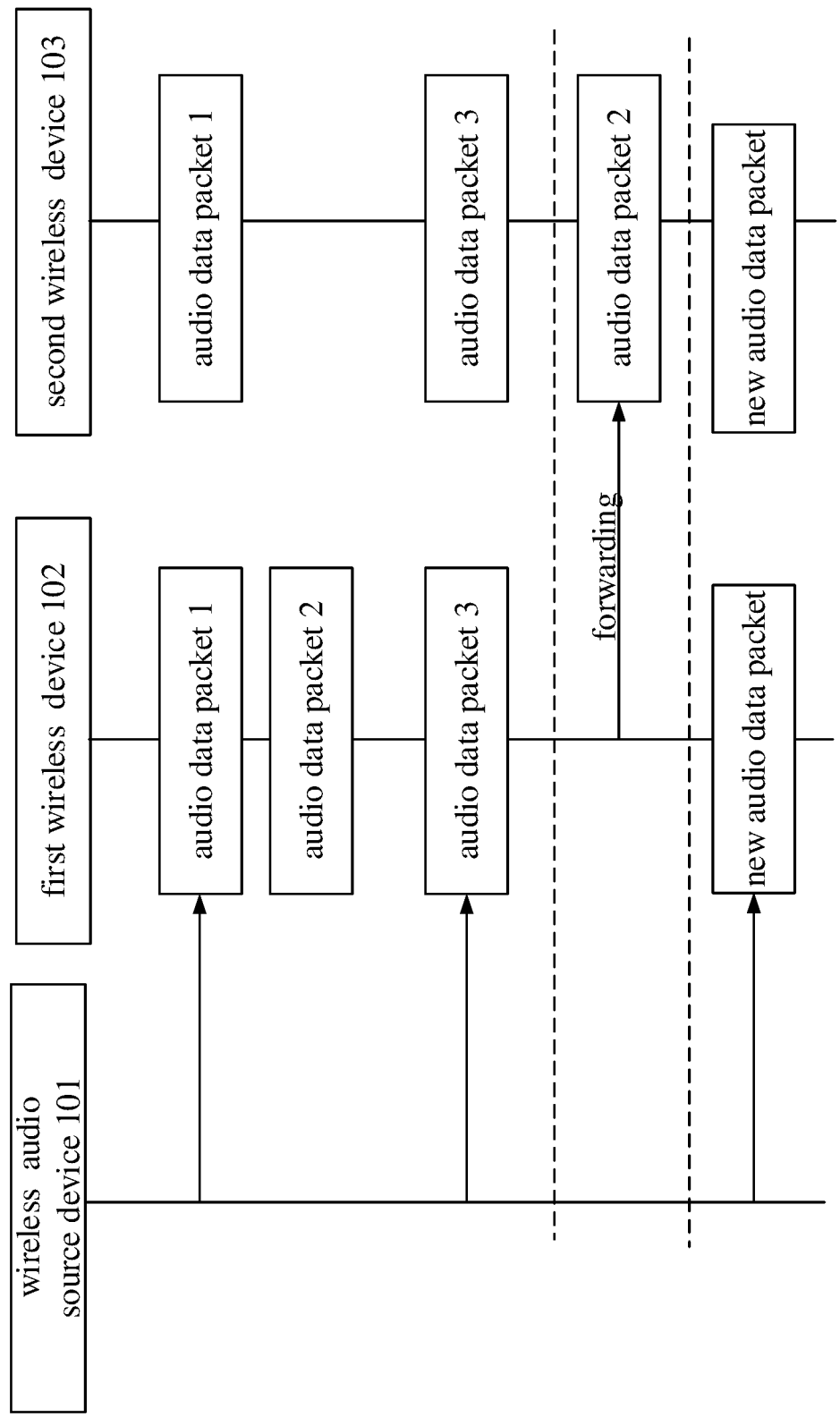
FIG. 3a is a schematic diagram of a process of correcting audio data according to an embodiment of the present invention.

Step S201: the first wireless device 102 sequentially receives a plurality of audio data packets sent by the wireless audio source device 101, and the second wireless device 103 sequentially monitors the plurality of audio data packets sent by the wireless audio source device 101 at the same time. Referring to FIG. 3a, after establishing a dual wireless communication network, the wireless audio source device 101 sends a plurality of audio data packets (for example, audio data packet 1, audio data packet 2, and audio data packet 3), the first wireless device 102 receives and the second wireless device 103 monitors the said plurality of audio data packets sent by the wireless audio source device 101, respectively. In this embodiment, the first wireless device 102 may maintain a receiving state for a predetermined period of time to receive a plurality of audio data packets. Or a number of audio data packets is predetermined, and the first wireless device 102 remains in a receiving state during the time that these number of audio data packets are received and sent. While the first wireless device 102 sequentially receives the plurality of audio data packets sent by the wireless audio source device 101, the second wireless device 103 sequentially monitors the said plurality of audio data packets sent by the wireless audio source device 101. It should be noted that the operation of the second wireless device 103 monitoring the said plurality of audio data packets cannot be regarded as a limitation on steps of the method applied in the first wireless device 102. While the first wireless device 102 sequentially receives the said plurality of audio data packets sent by the wireless audio source device 101, the second wireless device 103 may successfully monitor each audio data packet, or monitor part of the said plurality of audio data packets, or monitor none of the said plurality of audio data packets. It should be noted that as long as the first wireless device 102 and the second wireless device 103 constitute a pair of Bluetooth playback devices, in some embodiments, the second wireless device 103 may also be considered to be monitoring the said plurality of audio data packets when it is off.

Step S202: the first wireless device 102 identifies the audio data packets not been properly monitored by the second wireless device 103 among the plurality of audio data packets. In a specific embodiment, the audio data packets not been properly monitored includes cases where the received audio data is incomplete, erroneous, etc., and also includes cases where the audio data is not received. In a specific embodiment, it may be identified whether the audio data packets are not properly monitored, for example, by means of CRC checksum.

In an embodiment, when step S202 is performed, identifying the audio data packets not been properly monitored by the second wireless device 103 includes: receiving an additional packet sent by the second wireless device 103 at an idle time between the intervals of receiving each audio data packet, and the additional packet is used to indicate a monitoring status of the second wireless device 103 for a current audio data packet; determining whether the second wireless device 103 has successfully monitored the current audio data packet based on the additional packet; and identifying the current audio data packet as the audio data packets not been properly monitored by the second wireless device 103 if the second wireless device 103 fails to monitor the current audio data packet. Specifically, referring to FIG. 3b, for each audio packet monitored, the second wireless device 103 sends an additional packet to the first wireless device 102 at an idle intervals of the baseband during monitoring the audio data packets. The additional packet indicates the monitoring status of the second wireless device 103 for the current audio data packet, so that the first wireless device 102 can determine whether the second wireless device 103 has successfully monitored the current audio data packet based on the additional packet. As an example, referring to FIG. 3b, the second wireless device 103 has successfully monitored audio data packet 1 and audio data packet 3, but has not successfully monitored audio data packet 2.

In this embodiment, since the first wireless device 102 and the second wireless device 103 send and receive additional packets at baseband idle intervals, the first wireless device 102 does not occupy bandwidth resources while receiving the additional packets. In addition, the first wireless device 102 is kept under a receiving state during the process of receiving the additional packets, so the first wireless device 102 does not undergo state switching during the process. That is, the process of receiving additional packets by the first wireless device 102 does not result in time wastage and bandwidth loss due to switching of sending and receiving states, which improves the efficiency of data sending and receiving, and reduces the waste of communication bandwidth resources.

In another embodiment, when step S202 is performed, identifying the audio data packets not been properly monitored by the second wireless device 103 includes: after completing the operation of receiving the plurality of audio data packets from the wireless audio source device 101, receiving monitoring information sent by the second wireless device 103, the monitoring information indicating monitoring status of the second wireless device 103 for the plurality of audio data packets; identifying the audio data packets not been properly monitored by the second wireless device 103 based on the monitoring information. In a specific embodiment, the step of identifying the audio data packets not been properly monitored by the second wireless device 103 based on the monitoring information may include: comparing the monitoring information with data packet information of the plurality of audio data packets; and identifying the audio data packets that correspond to the monitoring information that does not match the packet information as the audio data packets not been properly monitored. Specifically, referring to FIG. 3c, after monitoring the plurality of audio data packets, the second wireless device 103 packages monitoring status of the current plurality of audio data packets into the monitoring information and sends it to the first wireless device 102. After receiving the monitoring information, the first wireless device 102 can identify the audio data packets not been properly monitored by the second wireless device 103 according to the monitoring information. As an example, referring to FIG. 3c, the second wireless device 103 has successfully monitored audio data packet 1 and audio data packet 3, but did not successfully monitor audio data packet 2.

In this embodiment, the first wireless device 102 is in a receiving state during the process of receiving the plurality of audio data packets, and is also in the receiving state during the process of receiving the monitoring information. Therefore, the first wireless device does not undergo state switching during the process, that is, the process of receiving the monitoring information by the first wireless device 102 does not result in time wastage and bandwidth loss due to switching of sending and receiving states, which improves the data sending and receiving efficiency and reduces the waste of communication bandwidth resources.

Figure 3B:
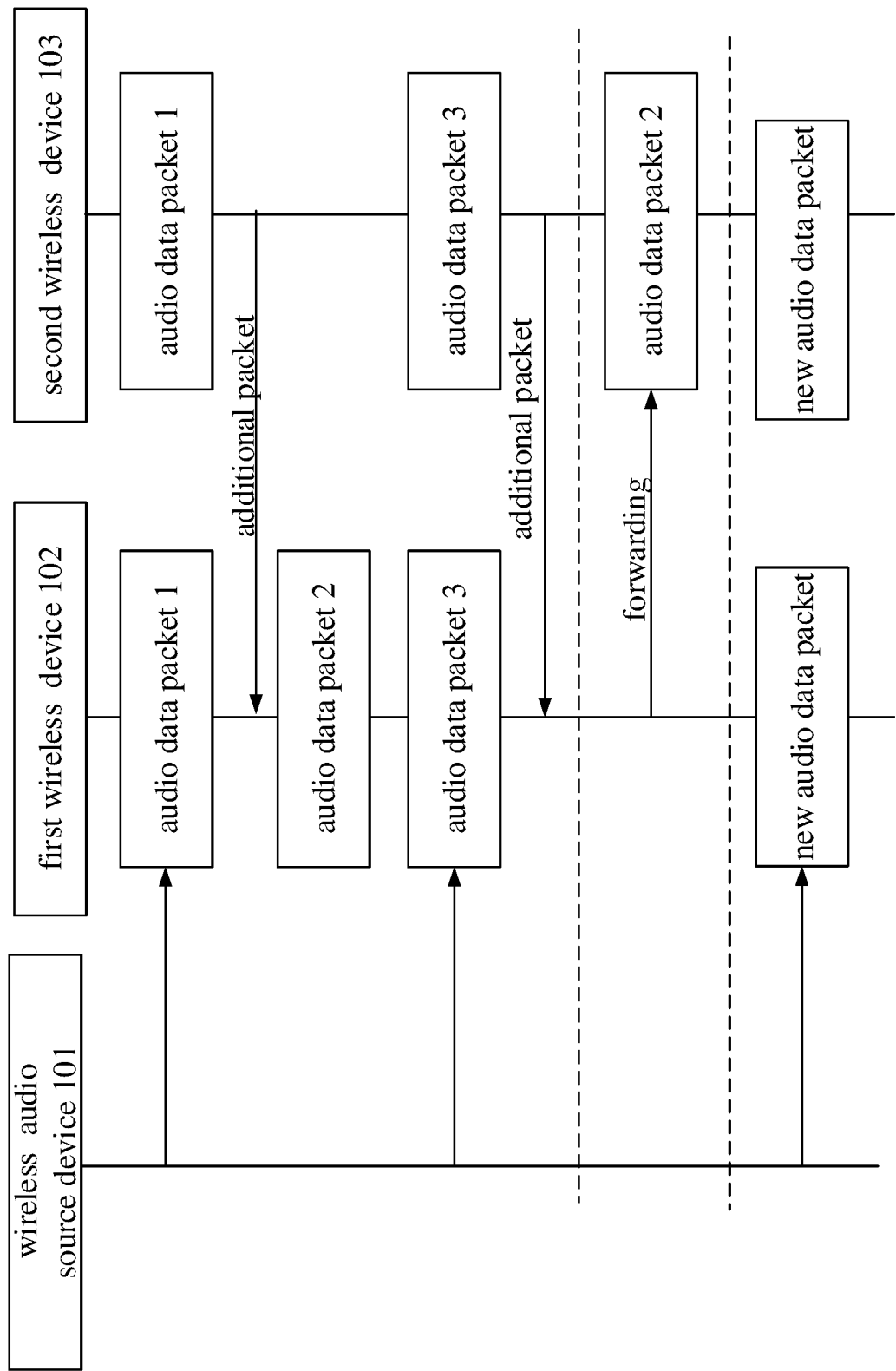
FIG. 3b is a schematic diagram of an example of a process of correcting audio data according to an embodiment of the present invention.
Figure 3C:
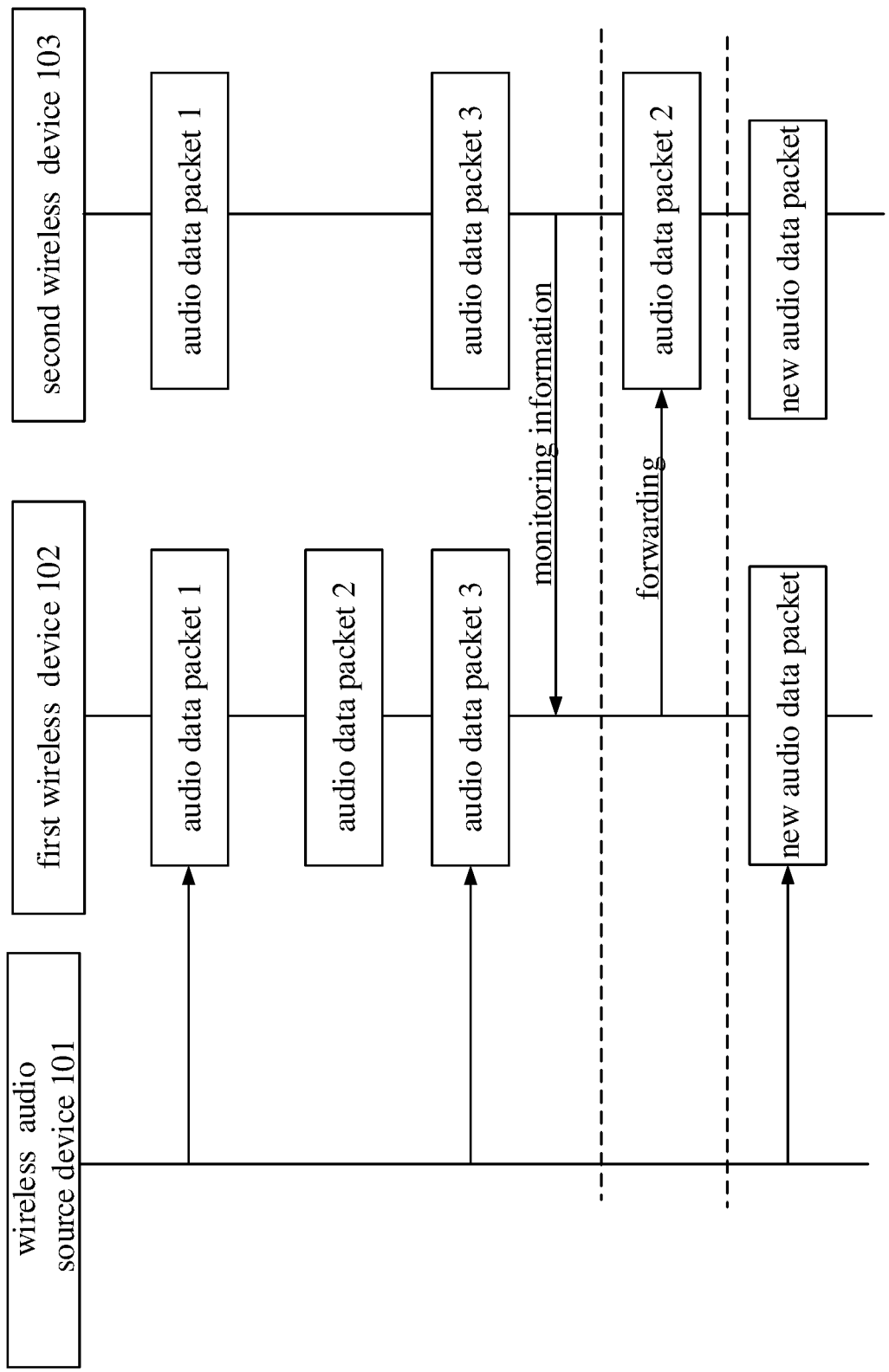
FIG. 3c is a schematic diagram of another example of a process of correcting audio data according to an embodiment of the present invention.

Step S203: after receiving the plurality of audio data packets, the first wireless device 102 forwards the audio data packets not been properly monitored by the second wireless device 103 to the second wireless device 103. In a specific embodiment, after identifying the audio data packets not been properly monitored by the second wireless device 103, the first wireless device 102 may switch to a sending state to forward the audio data packet not been properly monitored by the second wireless device 103. Referring to FIG. 3*a*, FIG. 3*b* and FIG. 3*c*, after identifying the audio data packets not been properly monitored by the second wireless device 103, the first wireless device 102 switches to a sending state, and forwards the correct correction packets to the second wireless device 103, so that the second wireless device 103 will correct the audio data packets not been properly monitored based on the forwarded the correct correction packets. As an example, as shown in FIG. 3*a*, FIG. 3*b* and FIG. 3*c*, the second wireless device 103 successfully monitors audio data packet 1 and audio data packet 3, but fails to monitors audio data packet 2. Then the first wireless device 102 forwards the audio data packet 2 to the second wireless device 103. After receiving the forwarded audio data packet 2, the second wireless device 103 may make corrections to audio packet 2.

In an optional embodiment, when step S202 is performed, when the first wireless device 102 is working in the receiving state, it may identify the audio data packets not been properly monitored by the second wireless device 103. And when the first wireless device 102 determines all the audio data packets is properly monitored by the second wireless device 103, there is no need to switch to a sending state, so that the first wireless device 102 remains under the receiving state, thereby reducing the frequency of state switching of the first wireless device 102.

In an optional embodiment, after the second wireless device 103 makes corrections to the audio packets successfully, the first wireless device 102 switches from the sending state to the receiving state and receives new audio packet sent by the wireless audio source device 101. Thus, a new audio packets reception cycle is started.

In an optional embodiment, between the execution of step S202 and step S203, the method may further comprise: after receiving the plurality of audio data packets, the first wireless device 102 sends a combined error correction data packet to the second wireless device 103, and the combined error correction data packet is used to correct errors of the audio data packets not been properly monitored by the second wireless device 103. Specifically, when the audio data packets not been properly monitored by the second wireless device 103 is identified, the corresponding error correction data may be combined into an error correction data packet to be sent to the second wireless device 103, and the second wireless device 103 may correct each of the audio data packets not been properly monitored according to error correction data packet. The error correction data packet contains error correction code obtained by encoding the audio data in the audio data packet, but not contains the audio data. The content of the error correction data packet can be dynamically adjusted according to the audio data acquisition of the audio data packets not been properly monitored by the second wireless device 103.

In an optional embodiment, after sending a combined error correction data packet to the second wireless device 103, the method further comprises: determining whether an error correction success response is received from the second wireless device 103 within a predetermined time; forwarding the audio data packets not been properly monitored by the second wireless device 103 to the second wireless device 103 if an error correction success response from the second wireless device 103 is not received within the predetermined time. If an error correction success response from the second wireless device 103 is received within the predetermined time, there is no need to forward the audio packets and the first wireless device 102 can keep under the receiving state to receive new audio data, does not require state switching.

In this embodiment, after receiving the plurality of audio data packets, the first wireless device 102 sends a combined error correction data packet to the second wireless device 103, which may reduce the frequency of sending the error correction data packets. That is, there is no need to correct each audio data packet not been properly monitored, thus reducing the frequency of state switching between sending and receiving state, thus reducing the time wasted and bandwidth loss caused by state switching during data sending and receiving, improving the efficiency of sending and receiving data and reducing the waste of communication bandwidth resources.

According to the method for correcting audio data during dual wireless communication disclosed in the embodiment of the present invention, in the process of receiving the plurality of audio data packets in sequence, the hardware circuit of the first wireless device can be maintained under the receiving state, and after receiving the plurality of audio data packets from the wireless audio source device, the first wireless device switches to the sending state, and forwards the audio data packets not been properly monitored by the second wireless device to the second wireless device, and corrects the audio data packets monitored by the second wireless device. Compared to the prior art, in which the first wireless device needs to perform multiple state switching in one data transceiving cycle, in the embodiment of the present invention, the first wireless device only needs to switch its state once for the plurality of audio data packets, which can effectively reduce the number of state switching of the first wireless device in the process of data sending and receiving, thereby reduce the time waste and bandwidth loss caused by the state switching of the first wireless device in the process of data sending and receiving, improve the efficiency of data sending and receiving, and reduce the waste of communication bandwidth resources.

An embodiment also discloses a method for correcting audio data during dual wireless communication applied in the second wireless device 103. Referring to FIG. 1*c*, the dual wireless communication network includes the wireless audio source device 101, the first wireless device 102 and the second wireless device 103. Specifically, refer to the above description of the embodiments, which will not be repeated herein.

Figure 4:
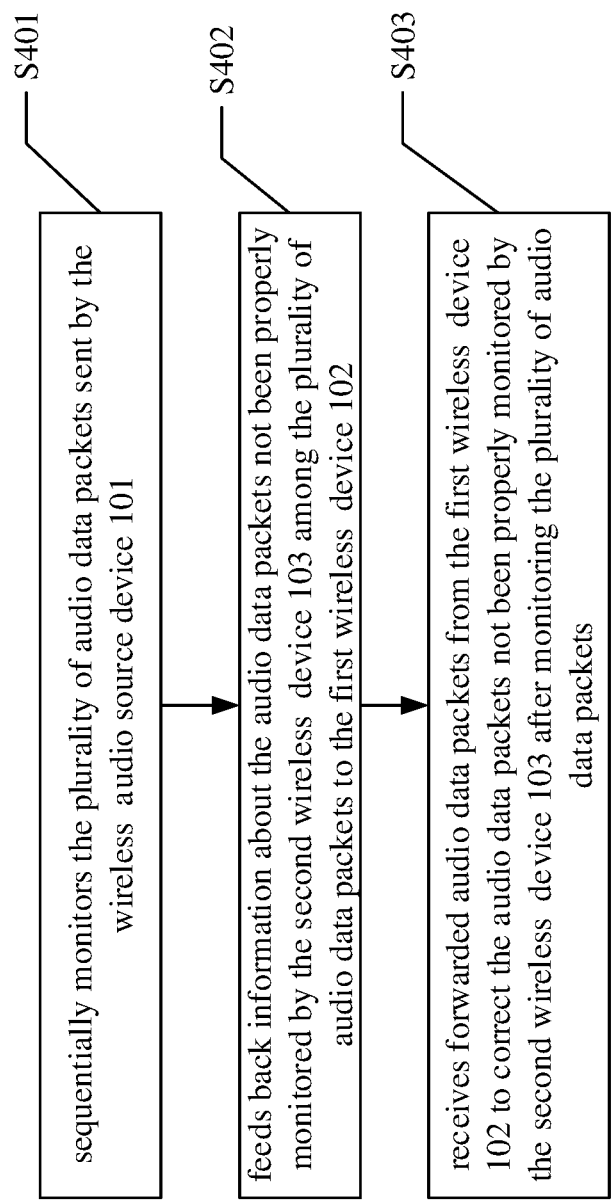
FIG. 4 is a flowchart of a method for correcting audio data during dual wireless communication at the end of a second wireless device in accordance with an embodiment of the present invention.

Referring to FIG. 4, it is a flowchart of a method for correcting audio data during dual wireless communication applied in the second wireless device 103 in one embodiment of the present invention. The method for correcting audio data includes steps S401 to S403.

Step S401: the second wireless device 103 sequentially monitors the plurality of audio data packets sent by the wireless audio source device 101, and the first wireless device 102 sequentially receives the plurality of audio data packets sent by the wireless audio source device 101 at the same time. It should be noted that the receiving operation of the first wireless device 102 cannot be considered a limitation on the method steps performed by the second wireless device 103.

Step S402: the second wireless device 103 feeds back information about the audio data packets not been properly monitored by the second wireless device 103 among the plurality of audio data packets to the first wireless device 102. In a specific embodiment, the second wireless device 103 feeds back information about the audio data packets not been properly monitored to the first wireless device 102, so that the first wireless device 102 may identify which of the plurality of audio data packets is not been properly monitored by the second wireless device 103.

Step S403: after monitoring the plurality of audio data packets, the second wireless device 103 receives the forwarded audio data packets from the first wireless device 102 to correct the audio data packets not been properly monitored by the second wireless device 103.

In this embodiment, after receiving audio data packets forwarded by the first wireless device 102, the second wireless device 103 may maintain under a receiving state to receive a new audio data packet sent by the wireless audio source device 101.

In an embodiment, when step S402 is performed, it may include: after monitoring the plurality of audio data packets, the second wireless device 103 sends monitoring information to the first wireless device 102, and the monitoring information indicating monitoring status of the second wireless device 103 for the plurality of audio data packets. In particular, referring to FIG. 3*c*, after the wireless audio source device 101 finishes sending the plurality of audio data packets, the second wireless device 103 completes the monitoring operation of the plurality of audio data packets. At this time, the second wireless device 103 may package the monitoring status of the plurality of audio data packets into the monitoring information, and switch from a receiving state to a sending state, and send the monitoring information to the first wireless device 102. The first wireless device 102 may be informed the data monitoring status of the second wireless device 103 based on the monitoring information. As an example, as shown in FIG. 3*c*, the second wireless device 103 has successfully monitored audio data packet 1 and audio data packet 3, but has not successfully monitored audio data packet 2. The first wireless device 102 may forward the audio packet 2 as a correction packet to the second wireless device 103 after being informed of the data monitoring status.

In this embodiment, the second wireless device 103, in the process of receiving audio data packets sent by the wireless audio source device 101, only needs to switch to the sending state to send the monitoring information after completing the monitoring operation of the plurality of audio data packets, so that the second wireless device 103 is able to send the monitoring information of the plurality of audio data packets to the first wireless device 102 via a single state switch. Then, it switches to a receiving state for correction processing, and during the correction process, it maintains the receiving state until it receives a new audio data packet from the wireless audio source device 101. That is, in the process from correction to reception of new audio data, no state switching is required. During the period from the current receiving cycle to a new receiving cycle, the second wireless device 103 only needs to switch its sending state once for the plurality of audio data packets, which can effectively reduce the number of state switching of the first wireless device in the process of data sending and receiving, thereby reduce the time waste and bandwidth loss caused by state switching of the first wireless device in the process of data sending and receiving, and improve the efficiency of data sending and receiving, and reduce the waste of communication bandwidth resources.

In an embodiment, when step S402 is performed, it may include: the second wireless device 103 sends an additional packet to the first wireless device 102 at an idle time between the intervals of monitoring each audio data packet, and the additional packet being used to indicate a monitoring status of the second wireless device 103 for a current audio data packet. Specifically, referring to FIG. 3*b*, the second wireless device 103 sends an additional packet to the first wireless device 102 at the idle intervals of the baseband for each audio data packet monitored during the process of monitoring the audio data packets. The additional packet indicates the monitoring status of the second wireless device 103 for the current audio data packet, so that the first wireless device 102 can determine whether the second wireless device 103 has successfully monitored the current audio data packet based on the additional packet. As an example, refer to FIG. 3*b*, the second wireless device 103 has successfully monitored audio data packet 1 and audio data packet 3, but has not successfully monitored audio data packet 2.

In this embodiment, the second wireless device 103 sends the additional packet to the first wireless device 102 at the idle intervals of the baseband for each audio data packet monitored during the process of receiving audio packets from the wireless audio source device 101. Since the second wireless device 103 sends the additional packets at intervals when the baseband is idle, the second wireless device 103 does not occupy bandwidth resources during the process of sending the additional packets. In addition, the second wireless device 103 receives the corrected audio data packets from the first wireless device 102 after completing the monitoring operation of the plurality of audio data packets, so that the first wireless device 102 only needs to switch receiving state once for the plurality of audio data packets, and during the correction process, it maintains the receiving state until it receives a new audio data packet send by the wireless audio source device 101. That is, in the process from correction to reception of new audio data, no state switching is required. During the period from the current receiving cycle to a new receiving cycle, the second wireless device 103 only needs to switch to the sending state at idle intervals for the plurality of audio data packets, and the second wireless device 103 maintains under the receiving state except for the idle time intervals, which reduces the time waste and bandwidth loss caused by state switching in the process of data sending and receiving, improves the efficiency of data sending and receiving, and reduces the waste of communication bandwidth resources.

An embodiment also discloses a method for correcting audio data during dual wireless communication applied in a first wireless device 102 and a second wireless device 103. Referring to FIG. 1*c*, the dual wireless communication network includes the wireless audio source device 101, the first wireless device 102 and the second wireless device 103. Specifically, refer to the above description of the embodiments, which will not repeated herein.

Figure 5:
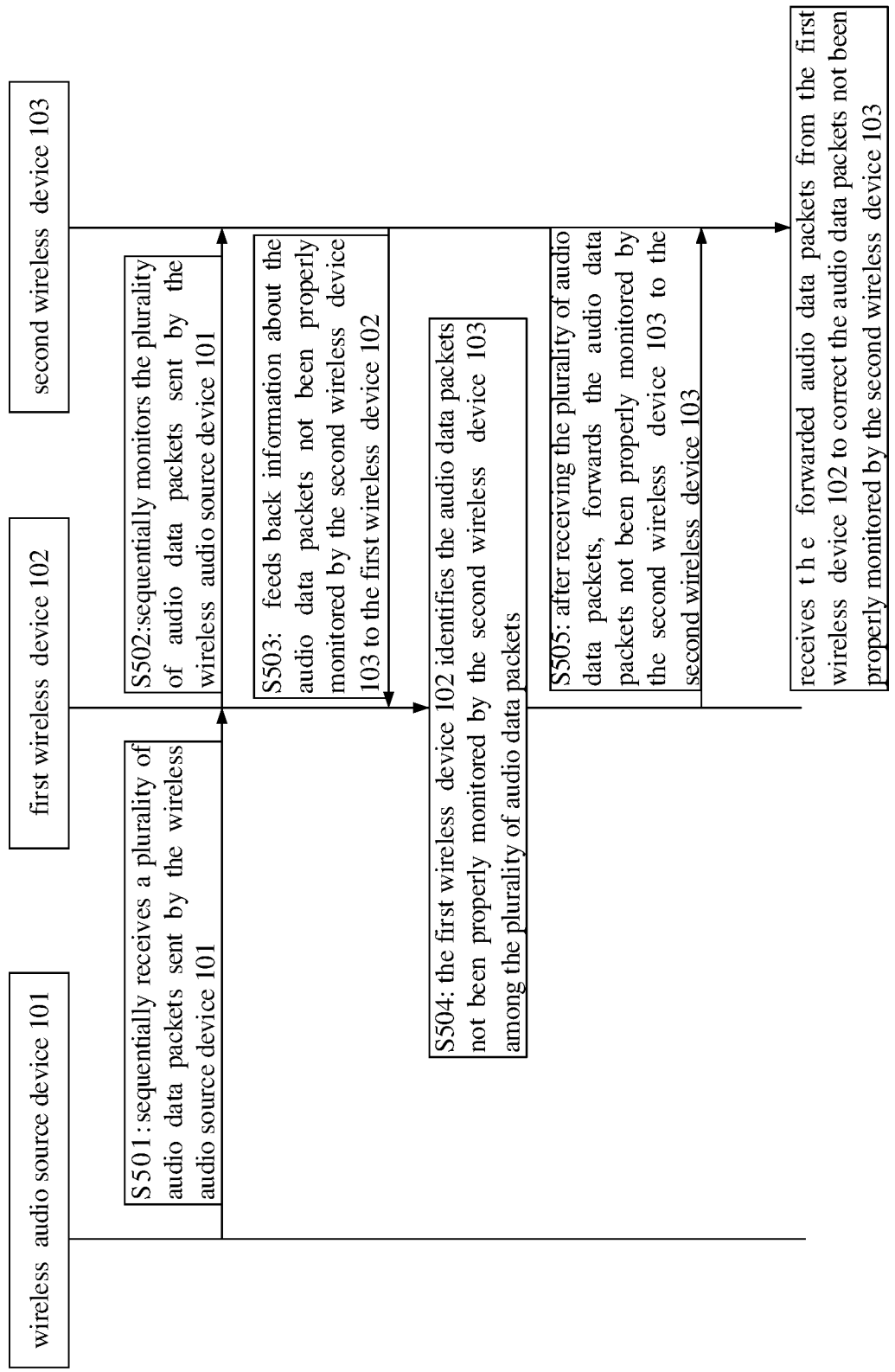
FIG. 5 shows a working sequence diagram of a method for correcting audio data during dual wireless communication in accordance with an embodiment of the present invention.

Referring to FIG. 5, it is a flowchart of a method for correcting audio data during dual wireless communication applied in applied in the first wireless device 102 and the second wireless device 103 in one embodiment of the present invention. The method for correcting audio data includes steps S501 to S505.

Step S501: the first wireless device 102 sequentially receives a plurality of audio data packets sent by the wireless audio source device 101. Specifically, refer to the above description of the embodiments, which will not be repeated here.

Step S502: the second wireless device 103 sequentially monitors the plurality of audio data packets sent by the wireless audio source device 101. Specifically, refer to the above description of the embodiments, which will not be repeated here. It is to be noted that the order of execution between steps S501 and S502 is not limited in this embodiment.

Step S503: the second wireless device 103 feeds back information about the audio data packets not been properly monitored by the second wireless device 103 to the first wireless device 102. Specifically, refer to the above description of the embodiments, which will not be repeated here.

Step S504: the first wireless device 102 identifies the audio data packets not been properly monitored by the second wireless device 103 among the plurality of audio data packets. Specifically, refer to the above description of the embodiments, which will not be repeated here.

Step S505: after completing the receiving operation of the plurality of audio data packets, the first wireless device 102 forwards the audio data packets not been properly monitored by the second wireless device 103 to the second wireless device 103. Specifically, refer to the above description of the embodiments, which will not be repeated here.

Figure 6:
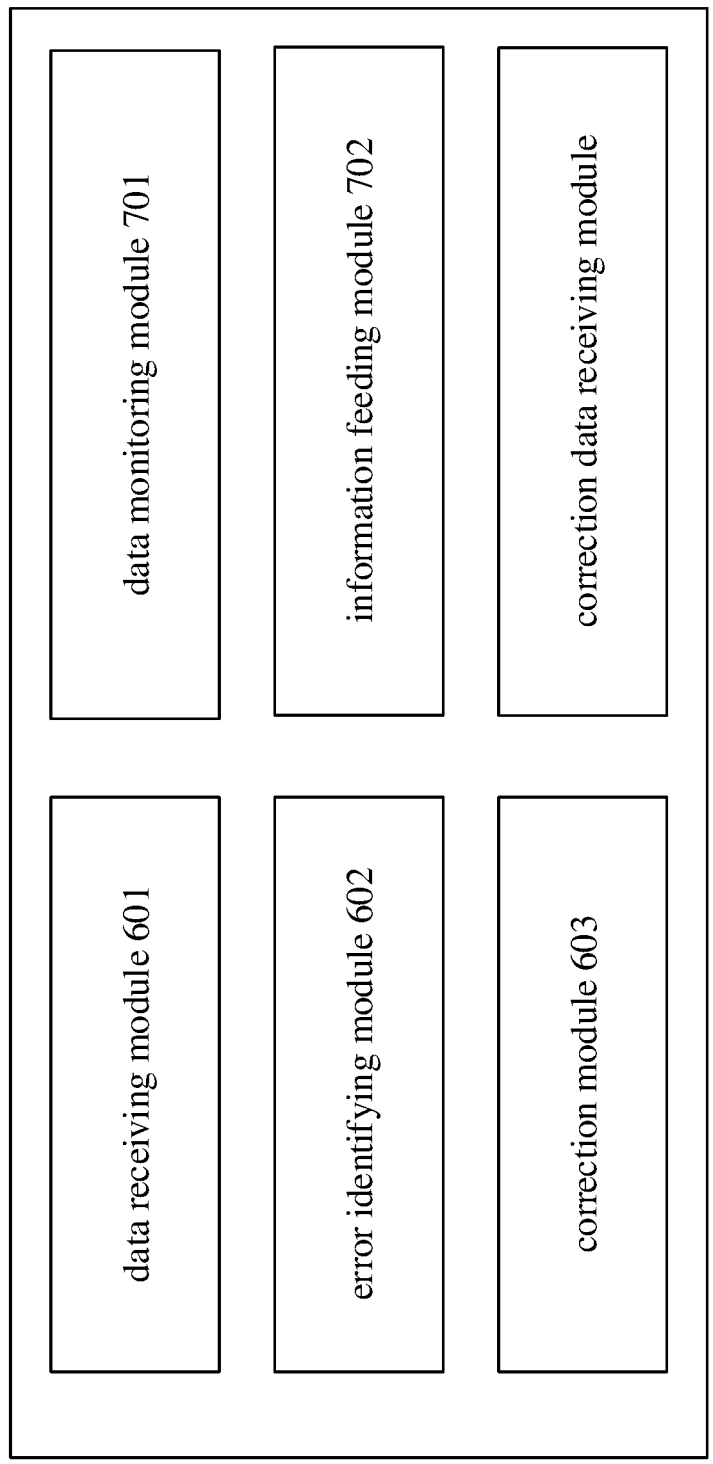
FIG. 6 is a schematic diagram of the structure of a device for correcting audio data during dual wireless communication in accordance with an embodiment of the present invention.

Referring to FIG. 6, it is an apparatus for correcting audio data during dual wireless communication in one embodiment of the present invention, applied in the first wireless device 102 and/or the second wireless device 103. The first wireless device 102 and the second wireless device 103 form a wireless playback device pair. The first wireless device 102 receives and the second wireless device 103 monitors the said plurality of audio data packets sent by the wireless audio source device 101, respectively. The apparatus for correcting audio data includes a data receiving module 601, an error identifying module 602 and a correction module 603.

The data receiving module 601 is configured to sequentially receive a plurality of audio data packets sent by the wireless audio source device 101, and the second wireless device 103 sequentially monitors the plurality of audio data packets sent by the wireless audio source device 101 at the same time. The error identifying module 602 is configured to identify the audio data packets not been properly monitored by the second wireless device 103 among the plurality of audio data packets. The correction module 603 is configured to forward the audio data packets not been properly monitored by the second wireless device 103 to the second wireless device 103 after the receiving operation of the plurality of audio data packets is completed.

In an optional embodiment, the apparatus for correcting audio data further includes a data monitoring module 701, an information feeding module 702 and a correction data receiving module 703.

The data monitoring module 701 is configured to sequentially monitor the plurality of audio data packets sent by the wireless audio source device 101, and the first wireless device 102 sequentially receives the plurality of audio data packets sent by the wireless audio source device 101 at the same time. The information feeding module 702 is configured to feedback information about the audio data packets not been properly monitored by the second wireless device 103 among the plurality of audio data packets to the first wireless device 102. The correction data receiving module 703 is configured to receive the forwarded audio data packets from the first wireless device 102 to correct the audio data packets not been properly monitored by the second wireless device 103 after the monitoring operation of the plurality of audio data packets is completed.

An embodiment also discloses a wireless playback device, the wireless playback device may be, for example, a wireless headset, a wireless speaker, or other device with function of wireless data interaction. The wireless playback device includes a processor for implementing a method for correcting audio data during dual wireless communication described in any of the above embodiment executed by the first wireless device.

An embodiment also discloses a wireless playback device, the wireless playback device may be, for example, a wireless headset, a wireless speaker, or other device with function of wireless data interaction. The wireless playback device includes a processor for implementing a method for correcting audio data during dual wireless communication described in any of the above embodiments executed by the second wireless device.

Figure 7:
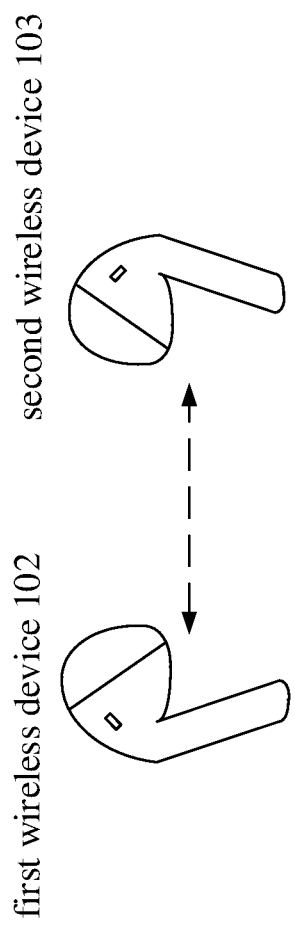
FIG. 7 shows a schematic diagram of the structure of a wireless playback system in accordance with an embodiment of the present invention.

Referring to FIG. 7, it is wireless playback system in one embodiment of the present invention. The wireless playback system includes a first wireless device 102 and a second wireless device 103. The first wireless device 102 is configured to receive and play audio data sent by a wireless audio source device 101. The second wireless device 103, is configured to monitor and play the audio data sent by the wireless audio source device 101. The first wireless device 102 and the second wireless device 103 form a wireless playback device pair; such as a left and right headphone pair, a wireless speaker pair.

Referring to FIG. 5, the first wireless device 102 sequentially receives a plurality of audio data packets sent by the wireless audio source device 101; the second wireless device 103 sequentially monitors the plurality of audio data packets sent by the wireless audio source device 101; the second wireless device 103 feeds back information about the audio data packets not been properly monitored by the second wireless device 103 to the first wireless device 102; the first wireless device 102 identifies the audio data packets not been properly monitored by the second wireless device 103 among the plurality of audio data packets; after receiving the plurality of audio data packets, the first wireless device 102 forwards the audio data packets not been properly monitored by the second wireless device 103 to the second wireless device 103; and the second wireless device 103 receives the forwarded audio data packets from the first wireless device 102 to correct the audio data packets not been properly monitored by the second wireless device 103.

Specifically, the respective steps and optional steps of the first wireless device 102 and the second wireless device 103 are described in any of the above embodiments and will not be repeated here.

Referring to FIG. 1c, an embodiment also discloses a dual wireless communication system. The dual wireless communication system includes the wireless playback system (the first wireless device 102 and the second wireless device 103) described in the above embodiment and the wireless audio source device 101. The wireless audio source device 101 is used to provide audio data to the wireless playback system. The wireless audio source device 101 may be a mobile phone, tablet, notebook, video player and other devices with function of wireless communication and audio data provision.

An embodiment further discloses a computer-readable storage medium on which a computer program is stored, and the computer program stored in the storage medium is used to implement a method of correcting audio data during dual wireless communication described in the embodiments above, which is executed by the second wireless device 103.

An embodiment further discloses a computer-readable storage medium on which a computer program is stored, and the computer program stored in the storage medium is used to implement a method of correcting audio data during dual wireless communication described in the embodiments above, which is executed by the first wireless device 102.

It should be understood that the embodiments above are merely illustrative and not restrictive and that, without departing from the basic principles of the present invention, various obvious or equivalent modifications or substitutions that may be made by a person skilled in the art, shall fall within the protection scope of the claims of the present invention.

What is claimed is:

1. A method for correcting audio data during dual wireless communication, applied in a first wireless device (102) and a second wireless device (103), wherein the first wireless device (102) and the second wireless device (103) form a wireless playback device pair, the first wireless device (102) receives audio data packets from a wireless audio source device (101), and the second wireless device (103) monitors the audio data packets from the wireless audio source device (101), the method comprising following steps:
   step S501: the first wireless device (102) sequentially receiving a plurality of audio data packets sent by the wireless audio source device (101);
   step S502: the second wireless device (103) sequentially monitoring the plurality of audio data packets sent by the wireless audio source device (101);
   step S503: for each audio packet monitored, the second wireless device (103) sending an additional packet to the first wireless device (102) at an idle interval of two adjacent audio data packets, wherein the additional packet is used to indicate a monitoring status of the second wireless device (103) for a current audio data packet;
   step S504: the first wireless device (102) receiving the additional packet at an idle time between the interval of the two adjacent audio data packets, and identifying the audio data packets not been properly monitored by the second wireless device (103) among the plurality of audio data packets based on the additional packets; and
   step S505: after receiving the plurality of audio data packets, the first wireless device (102) forwarding the audio data packets not been properly monitored by the second wireless device (103) to the second wireless device (103).

2. A method for correcting audio data during dual wireless communication, applied in a first wireless device (102), wherein the first wireless device (102) and a second wireless device (103) form a wireless playback device pair, the first wireless device (102) receives audio data packets from a wireless audio source device (101), and the second wireless device (103) monitors the audio data packets from the wireless audio source device (101), the method comprising following steps:
   step S201: sequentially receiving a plurality of audio data packets sent by the wireless audio source device (101); at the same time the second wireless device (103) sequentially monitoring the plurality of audio data packets sent by the wireless audio source device (101), for each audio packet monitored, the second wireless device (103) sending an additional packet to the first wireless device (102) at an idle interval of two adjacent audio data packets, wherein the additional packet is used to indicate a monitoring status of the second wireless device (103) for a current audio data packet;
   step S202: the first wireless device (102) receiving the additional packet at an idle time between the interval of the two adjacent audio data packets, and identifying the audio data packets not been properly monitored by the second wireless device (103) among the plurality of audio data packets based on the additional packets; and
   step S203: after receiving the plurality of audio data packets, forwarding the audio data packets not been properly monitored by the second wireless device (103) to the second wireless device (103).

3. The method for correcting audio data during dual wireless communication according to claim 2, wherein the first wireless device (102) identifies the audio data packets not been properly monitored by the second wireless device (103) under a receiving state.

4. The method for correcting audio data during dual wireless communication according to claim 2, wherein between the steps S202 and S203, further comprising:
   After completing operation of receiving the plurality of audio data packets, sending a combined error correction data packet to the second wireless device (103), wherein the combined error correction data packet is used to correct errors of the audio data packets not been properly monitored by the second wireless device (103).

5. The method for correcting audio data during dual wireless communication according to claim 4, wherein after sending the combined error correction data packet, further comprising:
   determining whether an error correction success response of error correction from the second wireless device (103) is received within a predetermined time;
   forwarding the audio data packets not been properly monitored by the second wireless device (103) to the second wireless device (103) if the error correction success response from the second wireless device (103) is not received within the predetermined time.

6. A wireless playback system, comprising:
   a first wireless device (102), configured to receive and play audio data packets sent by a wireless audio source device (101);
   a second wireless device (103), configured to monitor and play the audio data packets sent by the wireless audio source device (101); wherein:
   the first wireless device (102) and the second wireless device (103) form a wireless playback device pair;
   the first wireless device (102) sequentially receives a plurality of audio data packets sent by the wireless audio source device (101);
   the second wireless device (103) sequentially monitors the plurality of audio data packets sent by the wireless audio source device (101);
   the second wireless device (103) seconds an additional packet to the first wireless device (102) at an idle time between an interval of two adjacent audio data packets, wherein the additional packet is used to indicate a monitoring status of the second wireless device (103) for a current audio data packet;
   the first wireless device (102) receives the additional packet at the idle time between the interval of the two adjacent audio data packets, and identifies the audio data packets not been properly monitored by the second wireless device (103) among the plurality of audio data packets based on the additional packets;
   after completing operation of receiving the plurality of audio data packets, the first wireless device (102) forwards the audio data packets not been properly monitored by the second wireless device (103) to the second wireless device (103); and
   the second wireless device (103) receives the forwarded audio data packets from the first wireless device (102) to correct the audio data packets not been properly monitored by the second wireless device (103).

7. The wireless playback system according to claim 6, wherein the wireless playback system is a pair of wireless headphones or a pair of wireless speakers.

8. The wireless playback system according to claim 6, wherein the first wireless device (102) identifies the audio data packets not been properly monitored by the second wireless device (103) under a receiving state.

9. The wireless playback system according to claim 6, wherein the first wireless device (102) further sends a combined error correction data packet to the second wireless device (103) after receiving the plurality of audio data packets, wherein the combined error correction data packet is used to correct errors of the audio data packets not been properly monitored by the second wireless device (103).

10. The wireless playback system according to claim 9, wherein after sending the combined error correction data packet, the first wireless device (102) further:
- determines whether an error correction success response from the second wireless device (103) is received within a predetermined time; and
- forwards the audio data packets not been properly monitored by the second wireless device (103) to the second wireless device (103) in response to the error correction success response of error correction from the second wireless device (103) being not received within the predetermined time.

* * * * *